United States Patent [19]

Richardson

[11] 4,075,849

[45] Feb. 28, 1978

[54] TURBOCHARGER REGULATOR

[75] Inventor: Neil Ray Richardson, Palos Verdes Estates, Calif.

[73] Assignee: The Garrett Corporation, Los Angeles, Calif.

[21] Appl. No.: 719,633

[22] Filed: Sep. 1, 1976

[51] Int. Cl.² ............................................. F02D 23/00
[52] U.S. Cl. ........................................ 60/602; 60/605
[58] Field of Search ................. 60/602, 605, 611, 600, 60/601, 603; 417/407

[56] References Cited

U.S. PATENT DOCUMENTS

| 2,560,210 | 7/1951 | Browne | 60/602 |
|---|---|---|---|
| 3,035,408 | 5/1962 | Silver | 60/602 |
| 3,195,805 | 7/1965 | Cholvin et al. | 60/602 |
| 3,196,606 | 7/1965 | Cholvin et al. | 60/611 |
| 4,005,578 | 2/1977 | McInerney | 60/602 |
| 4,005,579 | 2/1977 | Lloyd | 60/602 |

Primary Examiner—Carlton R. Croyle
Assistant Examiner—L. J. Cosaregola
Attorney, Agent, or Firm—Jack D. Puffer; Stuart O. Lowry; Albert J. Miller

[57] ABSTRACT

A turbocharger for use with an internal combustion engine is disclosed which provides regulation of gas supply to the turbine by means of an integral regulator controlled by fluid pressure.

22 Claims, 6 Drawing Figures

TURBOCHARGER REGULATOR

BACKGROUND OF THE INVENTION

This invention relates to turbochargers in general and in particular to turbochargers for use with internal combustion engines, either diesel or gasoline fueled, which are used to supply charge air to the engine at elevated pressures. The turbocharger is a type having a regulator for controlling the pressure of the charge air to the engine.

The turbocharger comprises a compressor and turbine mounted on a common shaft. The inlet to the turbine connected to the engine exhaust manifold and is driven by the hot exhaust gases. The outlet of the compressor is connected to the engine inlet manifold for supplying charge air thereto.

In the prior art devices where regulators were used the regulators were commonly placed on the turbine side of the turbocharger and consisted of a separate add-on device attached to the turbine housing. The regulators thus attached were subject to the extreme high temperatures of the engine exhaust gas supplied to the turbine and further, protruded outside the turbocharger envelope and required excessive space for mounting to the engine. Additionally, the extreme heat of the exhaust gases were detrimental to the operation of the regulator actuator as well as the springs and diaphragms. Prior art devices which have attempted to overcome these disadvantages have resulted in complex unreliable mechanisms which were less well adapted to survive in the rigorous vibration and temperature environment of the engine compartment or were too bulky to be conveniently situated on the engine.

The present invention overcomes these disadvantages by incorporating the regulator as an integral part of the turbine housing. Further the working mechanism of the regulator is disposed toward the compressor side of the turbocharger and thus is removed from the heat source of the turbine discharge duct. In addition, the valving method used to distribute the exhaust gases to the turbine is arranged so that none of the exhaust gas is conducted to the environment without first passing through the engine exhaust gas treatment systems. The means of containment of the exhaust gases also provides an economical means of cooling the working mechanism of the regulator.

SUMMARY OF THE INVENTION

This invention provides a turbocharger which is of extremely compact design and in which the regulating device has been placed so as to insure the most favorable environment to enhance reliability. The valving of the turbine gas is arranged so that the high pressure of the engine exhaust which is supplied to the turbine acts to aid in the opening of the valve when the regulator so demands. In addition, the manner in which the gas is valved from the turbine ensures that all of the exhaust from the engine is passed through the engine exhaust gas treatment system to prevent contamination of environment. In addition, the design provides a compact machine which is easily accommodated in the engine compartment of passenger cars and in light trucks as well as large trucks to ensure its universal application.

DESCRIPTION OF THE PREFERRED EMBODIMENTS

Figure 1:
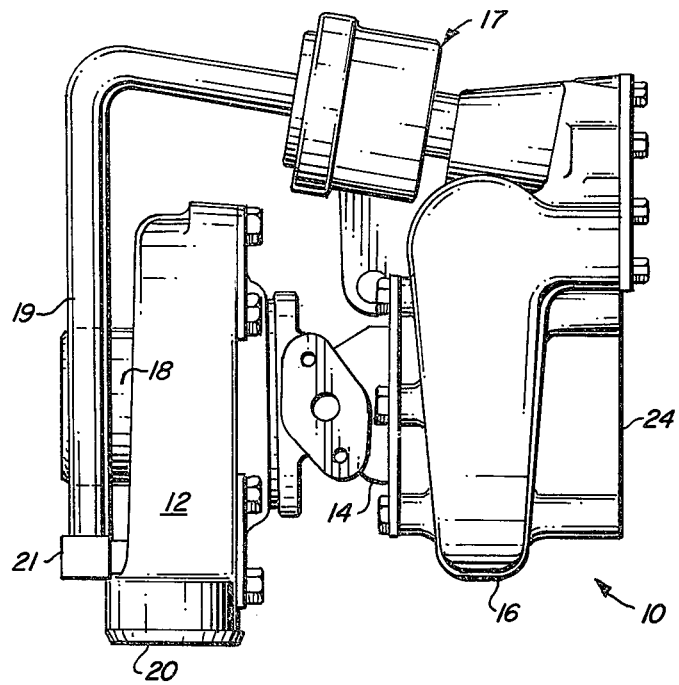
FIG. 1 is an outline of the turbocharger of the invention.
Figure 2:
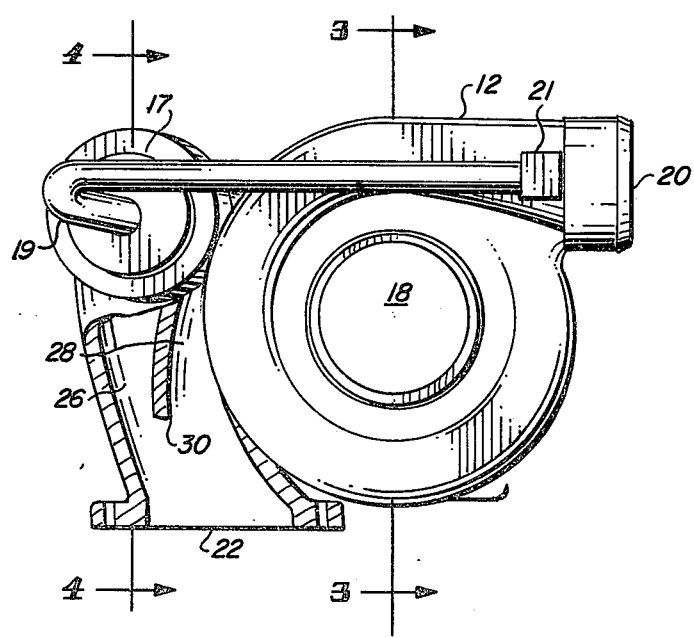
FIG. 2 is an end view of the turbocharger of FIG. 1 showing the turbine inlet portion in partial section.

Referring now to FIG. 1 there is shown at 10 an elevation view of the assembled turbocharger. The assembly comprises a compressor housing 12, a center housing assembly 14 and a turbine housing 16. The compressor housing 12 is provided with an inlet opening 18 for accepting charge air for the engine. The air is compressed by an impeller within the housing which will be discussed later and is discharged through discharge opening 20. The compressor and turbine housings are interconnected by center housing 14, and the turbine housing, as best seen in FIG. 2, has a hot gas inlet 22 which receives exhaust gas from the engine. The gas flow is divided by tongue 30 into two channels 26 and 28. The details of operation of this portion of the turbine will be discussed below. The hot gases are expanded through the turbine and discharged through opening 24 to the exhaust gas treatment system of the engine. There is provided integral with the turbine housing a regulator shown generally at 17 which is controlled by air from the compressor by means of conduit 19. The details of the regulator will be discussed below.

Figure 3:
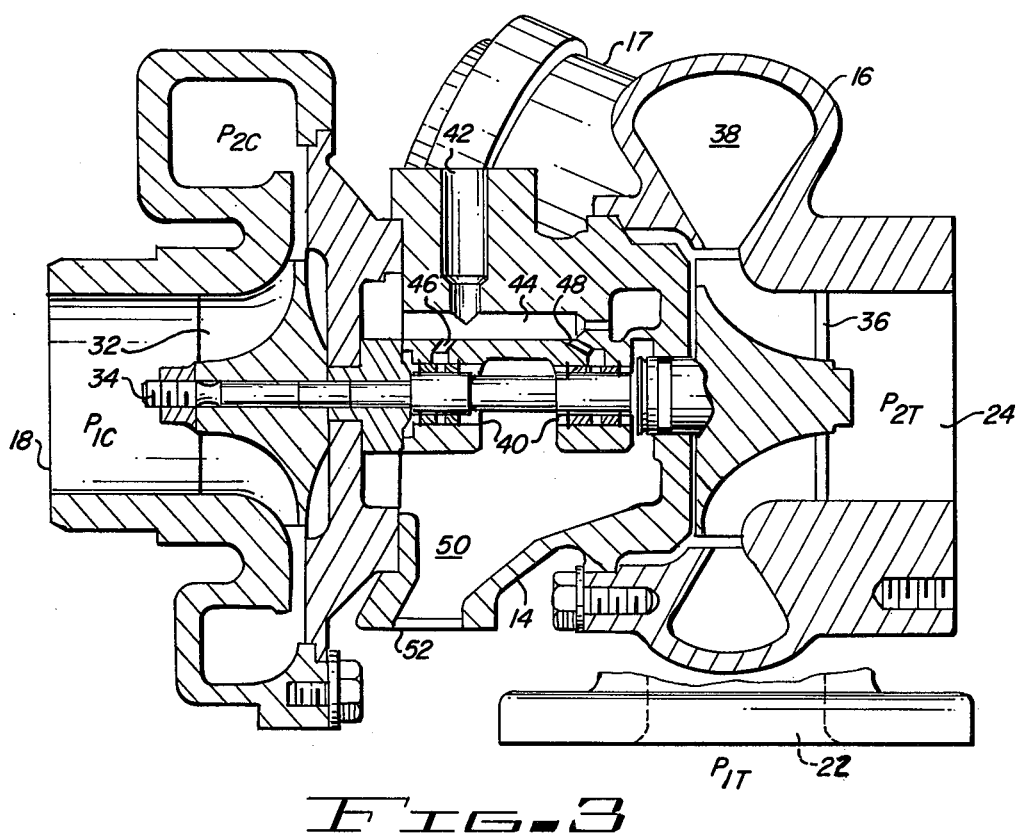
FIG. 3 is a sectional view of the turbocharger taken along line 3—3 of FIG. 2.

Referring now to FIG. 3, there is shown a sectional view of the turbocharger of FIG. 1. Within the compressor housing 12 there is provided a centrifugal compressor impeller 32 mounted on a rotating shaft 34 which is supported by the center housing 14. Within the turbine housing 16 is a radial inflow turbine 36 which is also mounted to the same shaft 34. The turbine receives the hot gas through the opening 22 and passage 28 into the scroll section 38 and is discharged through the blades of the turbine out exit 24.

Within the center housing there are provided bearings for support of the shaft 34 and means for lubrication of the bearings. The bearings, shown at 40, are of a journal type and are supported by the center housing. Lubricant from the engine crankcase or some other pressurized source is introduced through opening 42 into the chamber 44 in the center housing. From here the lubricant is ducted to the bearings by means of conduits 46 and 48 and is discharged into a chamber 50 and then returned to the lubrication source by means of opening 52 in the bottom of the center housing.

Figure 4:
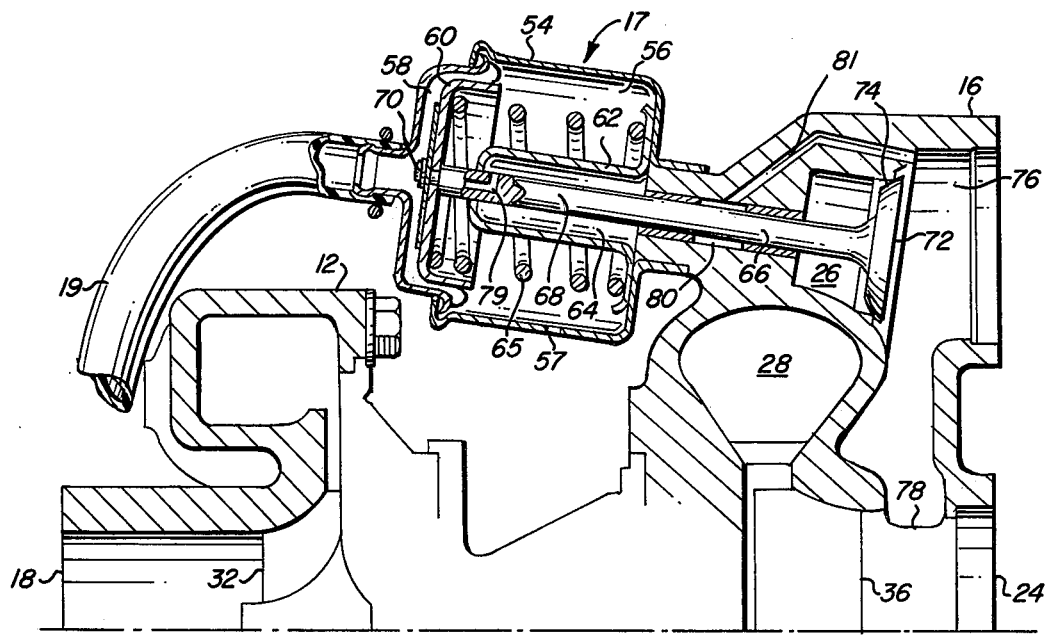
FIG. 4 is a sectional view of the regulator of the turbocharger taken along line 4—4 of FIG. 2.

In the description of the device the following notations will be used to denote pressures within the device:

$P_{1c}$ designates compressor inlet pressure
$P_{2c}$ designates compressor discharge pressure
$P_{1t}$ designates turbine inlet pressure
$P_{2t}$ designates turbine discharge pressure Referring now to FIG. 4 there is shown in sectional view details of the regulator 17. The regulator consists of a housing member 54 which is divided into two chambers 56 and 58 by means of a diaphragm member 60. The chamber 56 is vented to atmosphere via a port 57. Within chamber 56 there is provided an inner housing member 62 providing a third chamber 64 within the regulator. Surrounding the inner housing 62 is a spring member 65 which acts to bias the diaphragm member 60 toward the chamber 58. Mounted within the turbine housing 16 is valve member 66 which is comprised of a stem portion 68 and a head portion 72. The end of the stem portion 68 is connected to the diaphragm member 60 by means of a retainer 70. In the position shown, the head portion 72 of the valve 66 is heated in a valve seat designated 74 which is formed in the turbine housing. Within the turbine housing there is formed a third exhaust chamber 76 which communicates by means of opening 78 to the turbine discharge opening 24. In the closed position as shown the valve closes off communication between the channel 26 and chamber 76. In the valve stem 68 there is provided an opening 79 which provides communication between the conduit 19 and the inner chamber 64 of inner housing 62. In the turbine housing 16 there is provided an opening 81 which provides communication between a relief portion 80 and chamber 76, which in turn communicates with turbine exhaust port 24. Since the pressure $P_{2c}$ in chamber 58 is higher than the turbine outlet pressure $P_{2t}$ in chamber 76, exhaust from the engine which may flow around the valve stem from passage 26 toward relief portion 80 cannot further flow toward inner chamber 64, but rather is carried through opening 81 and discharged into chamber 76 where it is mixed with the turbine exhaust.

In operation of the device of FIG. 4, all of the engine exhaust is directed through channel 28 of the turbine inlet to accelerate the turbine as rapidly as possible. The compressor discharge pressure is sensed at 21 as shown in FIG. 2 and is transmitted to the actuator by means of conduit 19. When the compressor discharge pressure reaches the desired level, differential pressure across the diaphragm 60 causes the valve 66 to open thus allowing a portion of the engine exhaust gas to be conducted through channel 26 and discharged into chamber 76 and consequently through the turbine discharge port 24. Thus the engine inlet manifold pressure is maintained at a constant value of comprssor discharge pressure after the engine has reached some minimum speed and power output.

Figure 5:
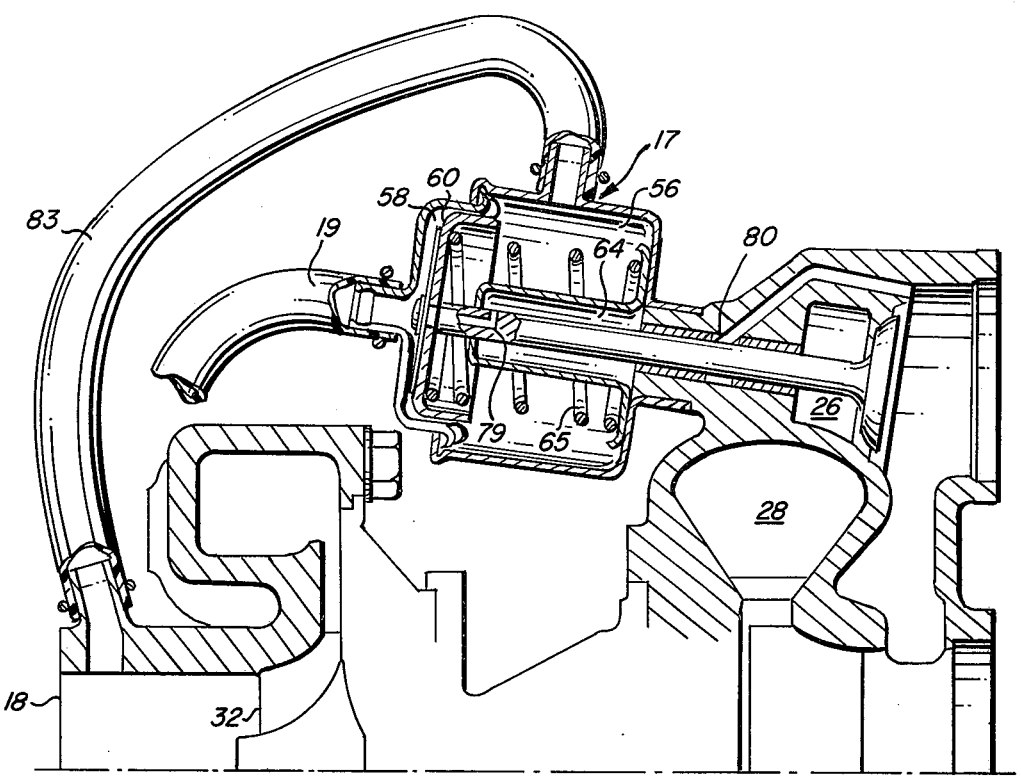
FIG. 5 is a sectional view of the regulator of FIG. 4 having an alternate method of control.

Referring now to FIG. 5 there is shown an alternate embodiment of the device which is to be used in the case where the engine is a gasoline fueled internal combustion engine having a throttle for controlling air flow upstream of the turbocharger compressor inlet. In the case of a diesel engine the compressor inlet pressure is atmospheric pressure and the chamber 56 of the actuator 17 is vented to the atmosphere in port 57 thus the differential pressure acting on the diaphragm 60 is the difference between compressor discharge pressure ($P_{2c}$) and atmospheric pressure. In the case of a throttled internal combustion engine the pressure $P_{1c}$ at the compressor inlet will not at all times be the same as atmospheric pressure. For example, when the engine is to be retarded the throttle is closed and the pressure at the compressor inlet will be substantially less than atmospheric pressure. Under the condition of increase of engine throttling it is desired to reduce engine inlet pressure as rapidly as possible by reducing $P_{2c}$. Thus in the configuration shown in FIG. 5 there is provided an additional conduit 83 which is connected between the compressor inlet opening 18 and the chamber 56 of the actuator 17. In this case the chamber 56 is not open to atmosphere but constitutes a sealed chamber. Thus, the pressure differential acting upon the diaphragm 60 is the pressure differential between the compressor discharge pressure and pressure immediately downstream of the throttle. This embodiment provides more rapid response to operator command than would be possible in the configuration of FIG. 4 for such a throttled engine. In the case of a gasoline fueled engine the fluid at the compressor inlet may be a mixture of gasoline and air. The conduit 83 also serves to return to the compressor inlet any fuel which may accumulate in chamber 56 of the actuator.

Figure 6:
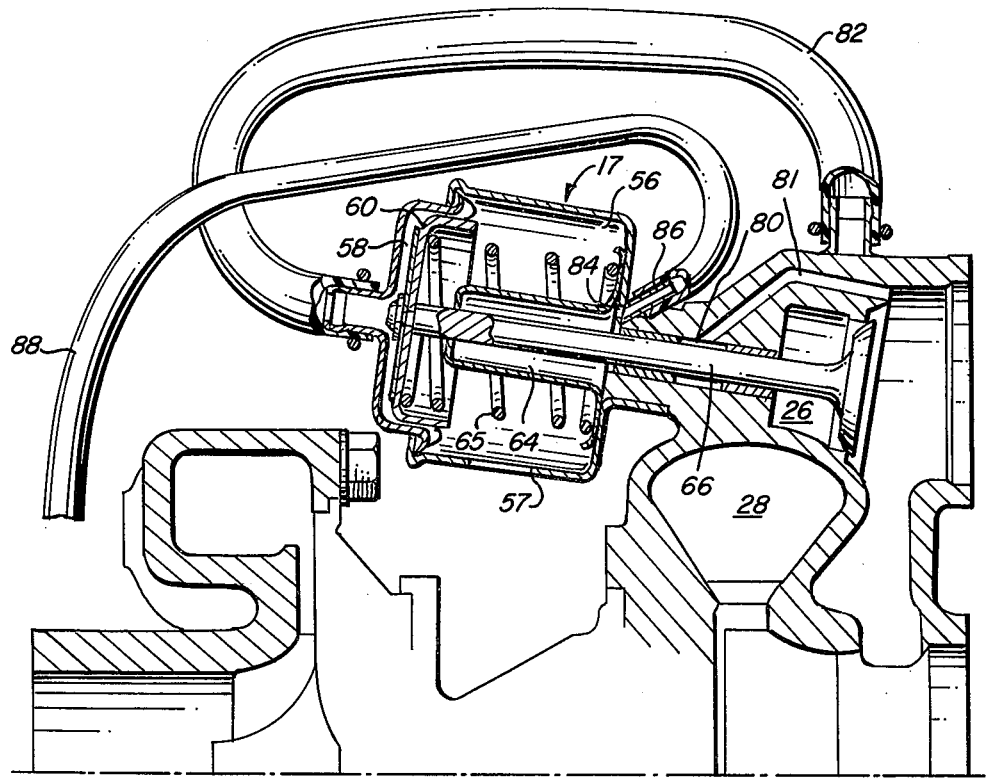
FIG. 6 is a sectional view of the regulator as shown in FIG. 4 having the regulator controlled by a turbine inlet pressure.

Referring now to FIG. 6 there is provided an alternative embodiment of the invention in which the actuator 17 is controlled in accordance with turbine inlet pressure $P_{1t}$. In this embodiment there is provided a conduit 82 which is connected between channel 26 of the turbine and chamber 58 of the actuator. In this embodiment the actuator is controlled by the differential pressure between chambers 58 and 56. Chamber 56 is vented to the atmosphere via a port 57, thus the differential is equal to the difference in turbine inlet pressure and atmospheric pressure. This embodiment is applicable in the case of diesel engines which are known as high torque rise engines. In these engines peak torque value is reached at a point below the normal cruise rpm of the engine. Thus, as the engine speed increases beyond the maximum torque point the valve 66 is opened by means of the actuator 17 to limit the boost at high speed. As the speed is decreased it is desired to have the torque increased. It is characteristic of turbocharged engines with boost controls that as speed is decreased, $P_{2c}$ is reduced less rapidly than $P_{1t}$. Thus as the turbine inlet pressure tends to decrease with engine speed the actuator tends to close the valve 66 to maintain a steady $P_{1t}$ and increase engine boost thus increasing the torque output. In the embodiment of FIG. 6 there may be provided an additional opening in the housing, as shown at 84, which connects the chamber 56 with the outside of the housing. At the external end of conduit 84 there is provided a fitting 86 for attachment of a conduit 88. The conduit 88 is conected to compressor discharge (not shown) for cooling the actuator when it is controlled by hot engine exhaust gases.

Thus it can be seen that there is provided herein a turbocharger adaptable to a variety of internal combustion engines and which places the temperature sensitive elements at the coolest possible point in the turbocharger consistent with a most compact design. Further the turbocharger provides alternate means of controlling the turbocharger output depending upon the engine characteristics.

Obviously many modifications and variations of the present invention are possible in light of the above teaching. It is therefore to be understood that within the scope of the appended claims the invention may be practiced otherwise than is specifically described.

What is claimed is:

1. A turbocharger for an internal combustion engine having an inlet manifold and an exhaust manifold, said turbocharger comprising:

a compressor housing having an inlet opening and an outlet opening, said outlet opening being connected to the inlet manifold of said engine for supplying charge air to said engine;

a turbine housing having an inlet opening and an outlet opening and a chamber intermediate said inlet and outlet openings forming a bypass conduit therebetween, the inlet opening of said turbine housing being connected to the exhaust manifold of said engine for receiving exhaust gases therefrom;

a center housing connecting said compressor housing with said turbine housing in spaced relationship and having a shaft mounted for rotation therein;

a compressor wheel mounted on said shaft in said compressor housing between said compressor inlet and outlet openings;

a turbine wheel mounted on said shaft in said turbine housing between said turbine inlet opening and said turbine outlet openings;

valve means slidably mounted in an opening in said turbine housing, said valve means having a head portion, and a stem portion received through the openings, said head portion forming selective sealing means for said bypass conduit;

actuator means including a source of control fluid, an actuator housing having a control fluid inlet and a control fluid outlet, flexible wall means separating said actuator housing into first and second chambers and connected to said stem portion of said valve means for selectively moving said valve head portion with respect to said bypass conduit, said first chamber being connected to said fluid inlet and said second chamber being connected to said fluid outlet, said actuator means being connected to said turbine housing and lying intermediate said turbine housing and said compressor housing, means connected between said fluid inlet and said source of control fluid for effecting a pressure differential between said first and second chambers for controlling the position of said valve, inner housing means forming a third chamber within said second chamber of said actuator housing, first conduit means connected between said first chamber and said third chamber, and second conduit means connected between said third chamber and said turbine housing outlet; and control means for controlling said actuator means in response to engine parameters.

2. The turbocharger according to claim 1 wherein said first conduit means comprises an opening in said valve stem communicating between said first and third chambers.

3. The turbocharger according to claim 2 wherein said second conduit means comprises a passage in said turbine housing between said valve stem opening intermediate its ends and said turbine housing downstream from the conduit between said first and third chambers.

4. The turbocharger according to claim 3 wherein the source of pressurized control fluid is the outlet opening of said compressor housing.

5. The turbocharger according to claim 4 wherein the outlet of said actuator housing is connected to ambient atmosphere.

6. The turbocharger according to claim 4 wherein the outlet of said second chamber is connected to the inlet of said compressor housing.

7. A turbomachine comprising in combination:

a compressor and a turbine mounted for rotation on a common shaft;

a center housing supporting said shaft for rotation about a central axis;

a compressor housing attached to one end of said center housing and having a fluid inlet and fluid outlet;

a turbine housing attached to the other end of said center housing and having a fluid inlet and a fluid outlet;

wall means in said turbine housing fluid inlet dividing said turbine housing fluid inlet into first and second channels, and a conduit connecting one of said channels between said turbine inlet and said turbine outlet;

valve means mounted in said turbine housing for selectively opening and closing the conduit in said turbine housing, said valve means including a stem portion and a head portion, said stem portion being slidably mounted in a valve stem opening in said turbine housing, said head portion forming a sealing member between the first and second chambers of said turbine housing, sealing means surrounding said valve stem portion at a point intermediate its ends within the valve stem opening in said turbine housing, and vent means connecting said valve stem opening and said turbine fluid outlet of said turbine housing, said vent means intersecting said valve stem opening between said sealing means and said valve head portion; and actuator means connected to said stem portion of said valve means for moving said valve means.

8. The turbomachine according to claim 7 wherein said actuator means comprises:

a control fluid source;

a cylindrical housing surrounding and concentric with the distal end of said valve stem;

resilient wall means divided said cylindrical housing into first and second chambers lying axially along said valve stem, said wall means being connected to the distal end of said stem portion of said valve means for movement therewith; and conduit means connecting said first chamber of said cylindrical housing with said source of control fluid.

9. The turbomachine according to claim 8 and further comprising means forming a third chamber within said second chamber of said cylindrical housing and concentric therewith and having openings in its end walls for passage of said valve stem therethrough, said valve stem having a generally central axial opening connecting said first chamber of said cylindrical housing with said third chamber.

10. The turbomachine according to claim 9 wherein said source of control fluid is the outlet of said compressor housing and said second chamber of said cylindrical housing is open to ambient pressure.

11. The turbomachine according to claim 9 wherein said source of control fluid is the outlet of said compressor housing and further comprising second conduit means connecting said second housing chamber with said compressor inlet.

12. The turbomachine according to claim 8 wherein the source of control fluid is the first chamber of said turbine housing.

13. The turbomachine of claim 12 and further comprising means forming a third chamber within said second chamber of said cylindrical housing and concentric therewith and having openings in its end walls for passage of said valve stem therethrough, and second conduit means connecting said third chamber with said compressor housing fluid outlet.

14. In combination:

turbine means including a turbine housing disposed around a rotatable turbine wheel, said turbine housing having a fluid inlet and a fluid outlet;

compressor means including a compressor housing disposed around a rotatable compressor wheel, said compressor housing have a fluid inlet and a fluid outlet;

center housing means disposed between and joining said turbine housing and said compressor housing and including a shaft disposed for rotation therein and operably connecting said turbine wheel and said compressor wheel for simultaneous rotation;

bypass means disposed in said turbine housing to bypass fluid around said turbine wheel, said bypass means connecting first and second chambers which communicate respectively with said turbine fluid inlet and fluid outlet;

valve means operably associated with said bypass means to selectively open and close the bypass means, said valve means including a stem portion and a head portion, said stem portion being slidably mounted in a valve stem opening in said turbine housing, said head portion forming a sealing member between the first and second chambers of said turbine housing, sealing means surrounding said valve stem portion at a point intermediate its ends within the valve stem opening in said turbine housing, and vent means connecting said valve stem opening and said turbine fluid outlet, said vent means intersecting said valve stem opening between said sealing means and said valve head portion; and actuator means connected to said stem portion of said valve means to actuate said valve means.

15. The combination according to claim 14 wherein said actuator means is controlled in response to the output of said compressor.

16. The combination according to claim 14 wherein said actuator means is controlled by the pressure differential between the fluid pressure at the compressor fluid inlet and the fluid pressure at the compressor fluid outlet.

17. The combination according to claim 14 wherein said actuator means is controlled according to the fluid pressure at said turbine fluid inlet.

18. A turbocharger, comprising a compressor and a turbine mounted for rotation on a common shaft; a center housing supporting said shaft for rotation about a central axis; a compressor housing attached to one end of said center housing and having a fluid inlet and a fluid outlet; a turbine housing attached to the other end of said center housing and having a fluid inlet and a fluid outlet; said turbine housing having a valve stem opening and a bypass passage formed therein, said bypass passage providing communication between said turbine housing fluid inlet and fluid outlet; a valve having a valve head and a valve stem, said valve stem being movably received through said valve stem opening and extending outwardly from said turbine housing, and said valve head being situated to open and close said bypass passage; and actuator means coupled to the outwardly extending end of said valve stem for movably controlling said valve head to open and close said bypass passage, said actuator means including a source of control fluid, an actuator housing having a control fluid inlet and a control fluid outlet, flexible wall means connected to said valve stem and said actuator housing, and separating said actuator housing into first and second chambers, said first chamber being connected to said actuator housing inlet and said second chamber being connected to said actuator housing outlet, means connected between said actuator housing inlet and said source of control fluid for effecting a pressure differential between said first and second chambers for controlling the position of said valve head, and an inner housing forming a third chamber within said second chamber, first conduit means coupled between said first and third chambers, said turbine housing including second conduit means coupled between said third chamber and said turbine housing outlet.

19. A turbocharger as set forth in claim 18 wherein said turbine housing fluid inlet includes wall means dividing said inlet into first and second channels, one of said channels being in communication with said bypass passage.

20. A turbocharger as set forth in claim 18 wherein said third chamber formed by said inner housing openly communicates with the valve stem opening formed in said turbine housing, said second conduit means comprising a passage integrally formed in said turbine housing and extending between said valve stem opening and said turbine housing outlet.

21. A turbocharger, comprising a compressor and a turbine mounted for rotation on a common shaft; a center housing supporting said shaft for rotation about a central axis; a compressor housing attached to one end of said center housing and having a fluid inlet and a fluid outlet; a turbine housing attached to the other end of said center housing and having a fluid inlet and a fluid outlet, said turbine housing having a valve stem opening and a bypass passage integrally formed therein, said bypass passage providing communication between said turbine housing fluid inlet and fluid outlet; a valve having a valve head and a valve stem, said valve stem being movably received through said valve stem opening and extending outwardly from said turbine housing, and said valve head being situated to open and close said bypass passage; and actuator means coupled to the outwardly extending end of said valve stem for movably controlling said valve head to open and close said bypass passage, said turbine housing including passage means coupled between said valve stem opening and said turbine housing outlet to discharge fluid within said valve stem opening to said turbine housing outlet.

22. A turbocharger as set forth in claim 21 wherein said actuator means includes means for effecting a fluid flow from said actuator means through said valve stem opening and said passage means to said turbine housing outlet.

* * * * *

UNITED STATES PATENT AND TRADEMARK OFFICE
CERTIFICATE OF CORRECTION

PATENT NO. : 4,075,849

DATED : February 28, 1978

INVENTOR(S) : Neil Ray Richardson

It is certified that error appears in the above-identified patent and that said Letters Patent are hereby corrected as shown below:

Column 3, line 53, change "in" to --via the--

Column 5, line 16, change "openings" to --opening--

Column 6, line 32, change "divided" to --dividing--

Column 8, line 39, change "turbine" to --center--

Signed and Sealed this

Thirteenth Day of June 1978

[SEAL]

Attest:

RUTH C. MASON
*Attesting Officer*

DONALD W. BANNER
*Commissioner of Patents and Trademarks*